United States Patent
Kim et al.

(10) Patent No.: US 7,634,086 B2
(45) Date of Patent: Dec. 15, 2009

(54) CIPHER DEVICE USING RC4 ALGORITHM AND METHOD THEREOF

(75) Inventors: Yun-Joo Kim, Daejeon (KR); Doo-Hyun Bae, Seoul (KR); Gwan-Yeon Kim, Yongin (KR); Se-Hyun Park, Seoul (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 796 days.

(21) Appl. No.: 11/289,181

(22) Filed: Nov. 28, 2005

(65) Prior Publication Data

US 2006/0133616 A1 Jun. 22, 2006

(30) Foreign Application Priority Data

Dec. 21, 2004 (KR) .................. 10-2004-0109448
Mar. 14, 2005 (KR) .................. 10-2005-0021022

(51) Int. Cl.
*H04L 9/00* (2006.01)
(52) U.S. Cl. .................. 380/28; 380/262; 380/44; 380/46
(58) Field of Classification Search .......... 380/28–29, 380/37, 44, 255, 259–260, 262, 264, 270, 380/277; 713/189–190
See application file for complete search history.

(56) References Cited

U.S. PATENT DOCUMENTS

2005/0240764 A1* 10/2005 Koshy et al. .............. 713/170

FOREIGN PATENT DOCUMENTS

| KR | 2003-0027459 | | 4/2003 |
|----|--------------|---|--------|
| KR | 2003-0061159 | A | 7/2003 |
| KR | 2003-0078453 | A | 10/2003 |

* cited by examiner

*Primary Examiner*—Hosuk Song
(74) *Attorney, Agent, or Firm*—Blakely, Sokoloff, Taylor & Zafman LLP

(57) ABSTRACT

An encryption/decryption device and a method thereof use an RC4 algorithm to reduce a waiting time for encryption/decryption thereby avoiding data process delay. The encryption/decryption device includes a management unit, an encryption/decryption unit, and a first interface. The management unit includes a WEP seed key generator for generating a WEP seed key based on a transmitter address of first data and a cipher suite value representing a cipher protocol type for the transmitter address, an RC4 key scheduler for generating S-Box data using the WEP seed key, and an S-Box data memory storing the S-Box data generated from the RC4 key scheduler for the transmitter addresses. The encryption/decryption unit has a core for performing the RC4 algorithm corresponding to the cipher suite, encrypting/decrypting the first data using the S-Box data transmitted from the management unit, and transmitting a signal for generating the S-Box data of second data to the management unit. The first interface transmits a control signal and a data signal between the management unit and the encryption/decryption unit.

13 Claims, 3 Drawing Sheets

```
Key_scheduling()
{
    /* initialization */
    for i = 0 to 255
        S[i] = i;
    /* scrambling */
    j = 0;
    for i = 0 to 255{
        j = (j + K[i] + S[i]) % 256;
        swap S[i] and S[j];
    }
}
```

11 — initialization
12 — scrambling

CIPHER DEVICE USING RC4 ALGORITHM AND METHOD THEREOF

CROSS-REFERENCE TO RELATED APPLICATION

This application claims priority to and the benefit of Korean Patent Applications 10-2004-0109448 & 10-2005-0021022 filed in the Korean Intellectual Property Office on Dec. 21, 2004 & Mar. 11, 2005 the entire content of which is incorporated herein by reference.

BACKGROUND OF THE INVENTION (a) Field of the Invention

The present invention relates to an encryption/decryption device in a wireless local area network (WLAN) and a method thereof. More particularly, the present invention relates to an encryption/decryption device using an RC4 algorithm for an encryption/decryption of RSNA 802.11 WLAN and a method thereof.

(b) Description of the Related Art

Recently, a series of standards for IEEE 802.11 wireless LAN technology developed by working groups of the IEEE have been focused on. Particularly, a Wired Equivalent Privacy (WEP), a Temporal Key Integrity Protocol (TKIP), and a Counter with CBC-MAC Protocol (CCMP) have been largely developed among components composed of an encryption/decryption IP of a Robust Security Network Association (RSNA) 802.11 WLAN.

Generally, the WEP is a security standard defined so as to supply security of the wire LAN-level for WLAN, and it uses encryption of an RC4 scheme and a CRC32 scheme so as to ensure integrity and secrecy for a link layer.

The TKIP is a security standard of a next generation WLAN, and generates different WEP seed keys for the respective packets according to a Transmitter Address (TA) and a TKIP Sequence Counter (TSC) and performs encapsulation and decapsulation on the different WEP seed keys using an RC4 encryption algorithm such as the WEP. Conventional WEP hardware is available to the existing encryption/decryption as it is currently given, and may further be used with software modification.

In addition, the CCMP is a security standard protocol of a next generation WLAN, and provides data secrecy, data integrity, and integrity of a selective header value using an AES-CCM encryption algorithm.

For such encryption/decryption, Korean Patent Publication No. 2003-0061159 discloses hardware for an IEEE 802.11 MAC web algorithm, that is, hardware for rapidly processing the WEP algorithm. According to the prior art, in order to minimize a delay of a frame processing time according to the WEP operation, the WEP algorithm is realized by configuring a state table in the form of a register file so that a secret key is determined to finish a key setup phase during 256 hardware cycles and generate 1 pseudo-random number during 1 hardware cycle. In addition, the state table generates a pseudo-random number to be used for encrypting/decrypting data. An operation for swapping values of the state table occurs on initializing the state table and generating a pseudo-random number. However, when the state table is used in form of the register file, the swapping operation is finished during 1 hardware cycle thereby minimizing the delay of the frame processing time.

Meanwhile, Korean Patent Publication No. 2003-0078453 discloses a method for encrypting/decrypting data in a WLAN and a device thereof. Particularly, in order to overcome a drawbacks of the WEP scheme used in the IEEE 802.11 standards, the method for encrypting/decrypting data in a WLAN and a device thereof performs XOR operation with the key sequences generated using an Integrity Check Value (ICV) as a seed and the transmitted data so that the external cannot tap and perceive the transmitted data.

However, in such an encryption/decryption algorithm, the WEP seed key is generated through the key mixing process, and the key scheduling process is performed using the WEP seed key in the RC4 encryption algorithm to generate S-Box data. These key mixing and scheduling processes, etc., are performed previous to the encryption/decryption process, whenever the respective data are processed. Accordingly, much time for preparing these processes is needed, that is, a waiting time is required for the encryption/decryption process.

Ultimately, a method for reducing the waiting time is required so as to rapidly encrypt/decrypt data in a WLAN system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an encryption/decryption device using an RC4 algorithm in a WLAN and a method thereof having advantages of preventing the delay of the data processing time occurring with the key scheduling process, and rapidly performing the encryption/decryption.

An exemplary encryption/decryption apparatus for encrypting/decrypting first data using an RC4 algorithm according to an embodiment of the present invention includes a management unit including a WEP seed key generator for generating a WEP seed key based on a transmitter address of first data and a cipher suite value representing a cipher protocol type for the transmitter address, an RC4 key scheduler for generating S-Box data using the WEP seed key and an S-Box data memory storing the S-Box data generated from the RC4 key scheduler for the transmitter addresses; an encryption/decryption unit having a core for performing the RC4 algorithm corresponding to the cipher suite, encrypting/decrypting the first data using the S-Box data transmitted from the management unit, and transmitting a signal for generating the S-Box data of a second data to the management unit; and a first interface for transmitting a control signal and data signal between the management unit and the encryption/decryption unit.

The cipher suite may be selected from a Wired Equivalent Privacy (WEP), a Temporal Key Integrity Protocol (TKIP), and a Counter with CBC-MAC Protocol (CCMP), and the data-ID value may be respectively given as an IV value, a TSC value, and a PN value, when the cipher suite is respectively given as a WEP, a TKIP, and a CCMP.

The RC4 key scheduler may receive the S-Box data generating signal from the encryption/decryption unit to generate the S-Box data for encrypting/decrypting the second data while the encryption/decryption unit encrypts/decrypts the first data, and the S-Box data memory may be a dual-port RAM.

An exemplary method for encrypting/decrypting first data received using an RC4 algorithm at a cipher engine wherein the cipher engine generates and stores S-Box data through an interface includes a) receiving the S-Box data corresponding to the first data from the management unit; b) encrypting/decrypting the first data using the S-Box data; and c) transmitting a signal to the management unit, the signal being used for generating S-Box data corresponding to second data to be input next to the first data.

DETAILED DESCRIPTION OF THE EMBODIMENTS

Figure 1:
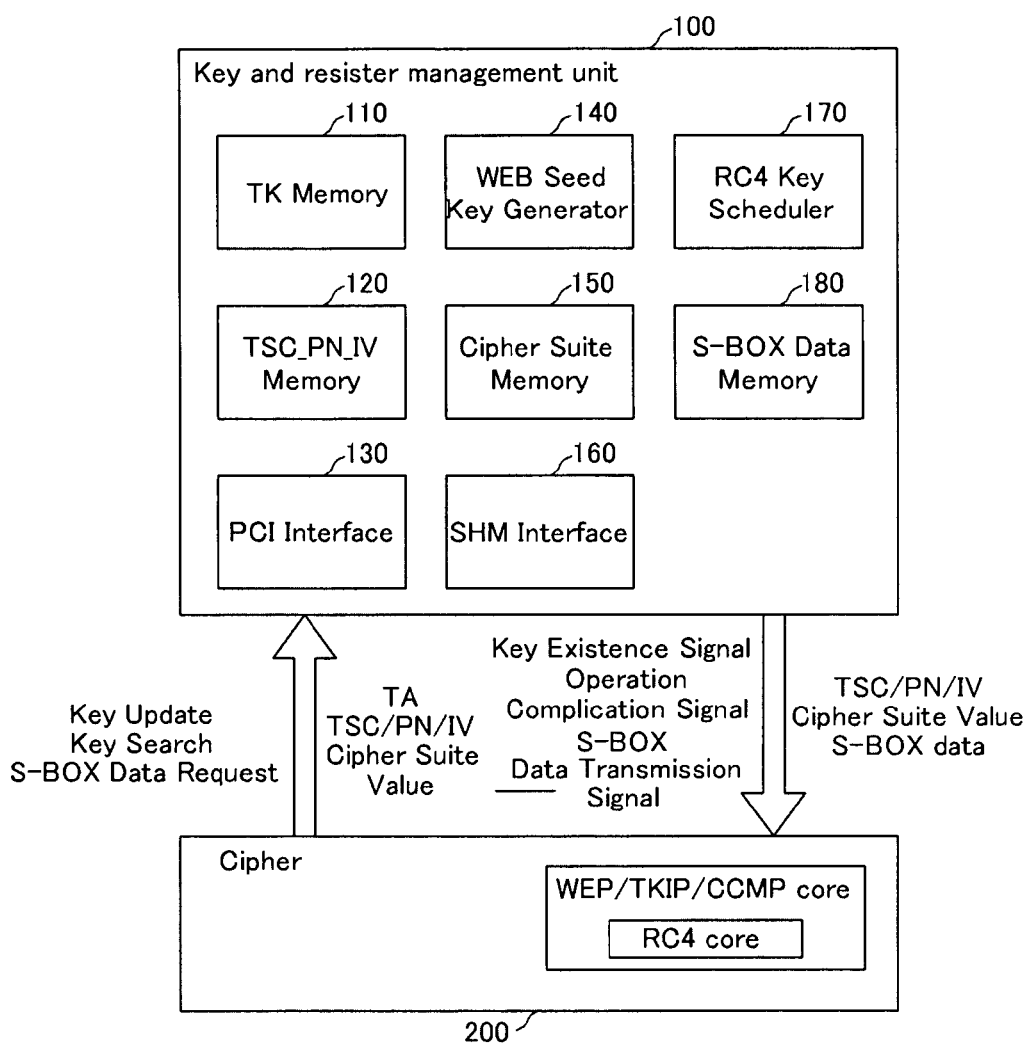
FIG. 1 is a schematic view illustrating an encryption/decryption device for encrypting/decrypting data in a WLAN according to an exemplary embodiment of the present invention.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The TKIP encryption/decryption process includes phase-1 key mixing and phase 2 key mixing processes for generating a WEP seed key, a key scheduling process for scrambling S-Box data by using the WEP seed key, and a process for generating a key sequence in the pseudo-random number generator (hereinafter, called PRGN). The phase-1 key mixing process and the phase-2 key mixing process use a temporal key (TK), a TKIP Sequence Counter (TSC), and a transmitter address (TA) to generate a WEP seed key to be used in the RC4 encryption algorithm. The TSC is incremented by '1' for the respective encryption/decryption processes to generate different WEP seed keys for the respective MAC protocol data units (MPDU). That is, the TSC value is incremented by '1' for a MPDU to be processed, and the WEP seed key is generated through the phase-1 key mixing and phase-2 key mixing processes and is applied to the RC4 module. The RC4 module generates S-Box data by using the WEP seed key in the key scheduling process. Thereafter, a key sequence for encrypting is generated by using the S-Box data.

Meanwhile, the WEP encryption/decryption process uses the WEP seed key which is used in the RC4 encryption algorithm and generated by combining an initialization vector (IV) with TK. Such a WEP encryption/decryption is different from the TKIP encryption/decryption in that the phase-1 key mixing and phase-2 key mixing processes are not required whenever the MPDU is processed, and is similar to the same in that the RC4 module performs the key scheduling process. The RC4 key scheduling process is performed during a relatively short clock cycle, that is, a short time in comparison with the phase-1 key mixing and phase-2 key mixing processes that are additionally required in the TKIP encryption/decryption process. The key scheduling process uses almost all of time for performing the encryption/decryption processes.

FIG. 1 is a schematic view illustrating an encryption/decryption device for encrypting/decrypting data in a WLAN according to an exemplary embodiment of the present invention.

As shown in FIG. 1, an encryption/decryption device includes a key and register management unit 100 and a cipher engine, that is, an encryption/decryption unit 200.

The key and register management unit 100 generates and manages a WEP seed key and S-Box data. The key and register management unit 100 includes a TK memory 110, a TSC_PN_IV memory 120, a Peripheral Component Interconnect interface (PCI interface) 130, a first TKIP key mixing unit 140, a cipher suite memory 150, a secure hardware module interface (SHM interface) 160, an RC4 key scheduler 170, and S-Box data memory 180.

The TK memory 110 stores a temporal key (TK) used to encrypt/decrypt the corresponding transmitter address.

The TSC_PN_IV memory 120 stores a data-ID value mapping the corresponding transmitter address according to the cipher suite. When the cipher suite is respectively given as a WEP, a TKIP, and a CCMP, the data-ID value is respectively given as an IV value, a TSC value, and a PN value.

The PCI interface 130 communicates with a driver so as to receive the key values corresponding to the TA, the corresponding cipher suite value, and the data ID value according to the cipher suite (i.e., TSC, IV, and PN for the respective TKIP, WEP, and CCMP) after an authentication process. The TA, data ID value (TSC, PN or IV), and cipher suite value are respectively stored at the TSC_PN_IV memory 120, the TK memory 110, and the cipher suite memory 150 when key storing signals are inputted.

The WEP seed key generator 140 generates a WEP seed key using the TA, the data ID value (TSC, PN, or IV), the TK, and the cipher suite value. Particularly, when the cipher suite value is the TKIP so that the encryption unit 200 generates a key update signal by performing the phase-1 and phase-2 key mixing processes, the WEP seed key is generated using the TA, TSC, and TK received from the encryption unit 200. When the cipher suite value is the WEP, the WEP seed key is generated by combining the TK with the data ID IV.

The cipher suite memory 150 stores a protocol type (WEP, TKIP, or CCMP) value for mapping the TA.

The SHM interface 160 is communicated with the encryption/decryption unit 200 so as to transmit and receive desired data and control signals.

The RC4 key scheduler 170 performs the key scheduling process in the RC4 algorithm to generate S-Box data by using the WEP seed key generated from the WEP seed key generator 140.

The S-Box data memory 180 stores the S-Box data for the respective transmitter addresses. The S-Box data memory 180 is designed as a dual-port RAM, writes writing data at a writing address when a writing signal is set as '1' at the rising edge of a clock cycle, and outputs the stored data from a reading address when the reading signal is set as '1' at the falling edge of the clock cycle.

The encryption/decryption unit 200 includes a module for encapsulating and decapsulating an MPDU. The module for encapsulating and decapsulating may include a WEP, a TKIP, or a CCMP core. The module for encapsulating and decapsulating includes an RC4 core in which an RC4 encryption algorithm is realized as hardware. In addition, the encryption/decryption unit 200 is connected with the key and register management unit 100 to transmit/receive a control signal and data.

In more detail, in FIG. 1, the encryption/decryption unit 200 transmits control signals (for example, key update, key detecting, and S-Box data request signals) and data (for example a TA, an updated data ID (TSC, PN, or IV), and the corresponding cipher suite value) to the key and register management unit 100. The encryption/decryption unit 200 receives control signals (for example, a signal for notifying of the key existence, a signal for notifying of the end of the operation related to the key, and an S-Box data transmission start/end signal) and data (for example, a detected key value, a data ID value (TSC, PN, or IV), the cipher suite value, and the S-Box data) from the key and register management unit 100.

A key scheduling process of the RC4 key scheduler 170 will be described in detail with reference to FIG. 2A and FIG. 2B.

Figures 2A, 2B:
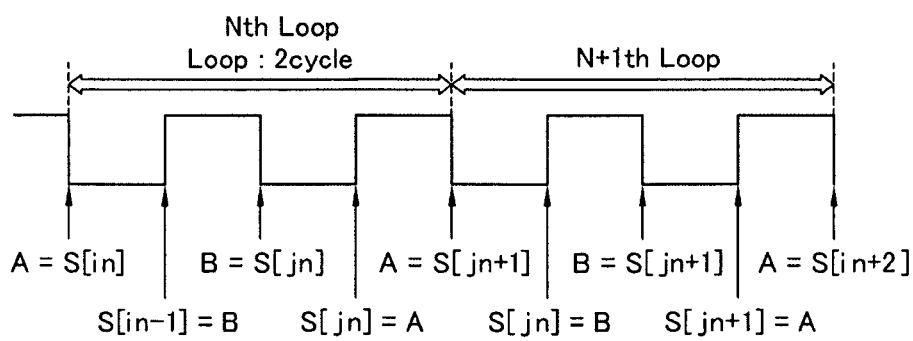
FIG. 2A shows operation logic of a key scheduling process.
FIG. 2B is a block diagram showing approach timing of an S-Box data memory 180.

FIG. 2A shows an operation logic view of a key scheduling process, and FIG. 2B is a block diagram showing approach timing of S-Box data memory.

As shown in FIG. 2A, the key scheduling process includes an initialization process 11 and a scrambling process 12.

The initialization process initializes the S-Box so that an S[I] value is initialized to be "i". When the initialization signal is transmitted to the S-Box data memory 180, the addresses can be initialized at once. Thus, the initialization process is performed over only 1 clock cycle.

The scrambling process mixes the S-Box data according to the WEP seed key values. The data addresses (i, j) to be mixed are generated through 256th loop and the S[i] and S[j] values are mixed to generate the S-Box data. Such S-Box data are stored at the S-Box data memory 180.

As shown in FIG. 2B, the S-Box data memory 180 is designed as a dual-port RAM, it writes data at a writing address when a writing signal is set as '1' at the rising edge of a clock cycle (a point which the clock cycle is varied from '0' to '1'), and it outputs the stored data from a reading address when a reading signal is set as '1' at the falling edge of the clock cycle (a point which the clock cycle is varied from '1' to '0'). Since the S-Box data memory 180 uses a dual-port RAM and data are dependent, one-loop is performed over only 2 clock cycles. That is, the key scheduling process can use approximately 515 clock cycles since 3 clock cycles are required for the initialization process, etc., and 512 clock cycles are required for 256 loops of the scramble process. Through such a key scheduling process, the S-Box data are generated to be stored at the S-Box data memory 180.

A key sequence process of the encryption/decryption unit 200 will be described in detail with reference to FIG. 3.

Figure 3:
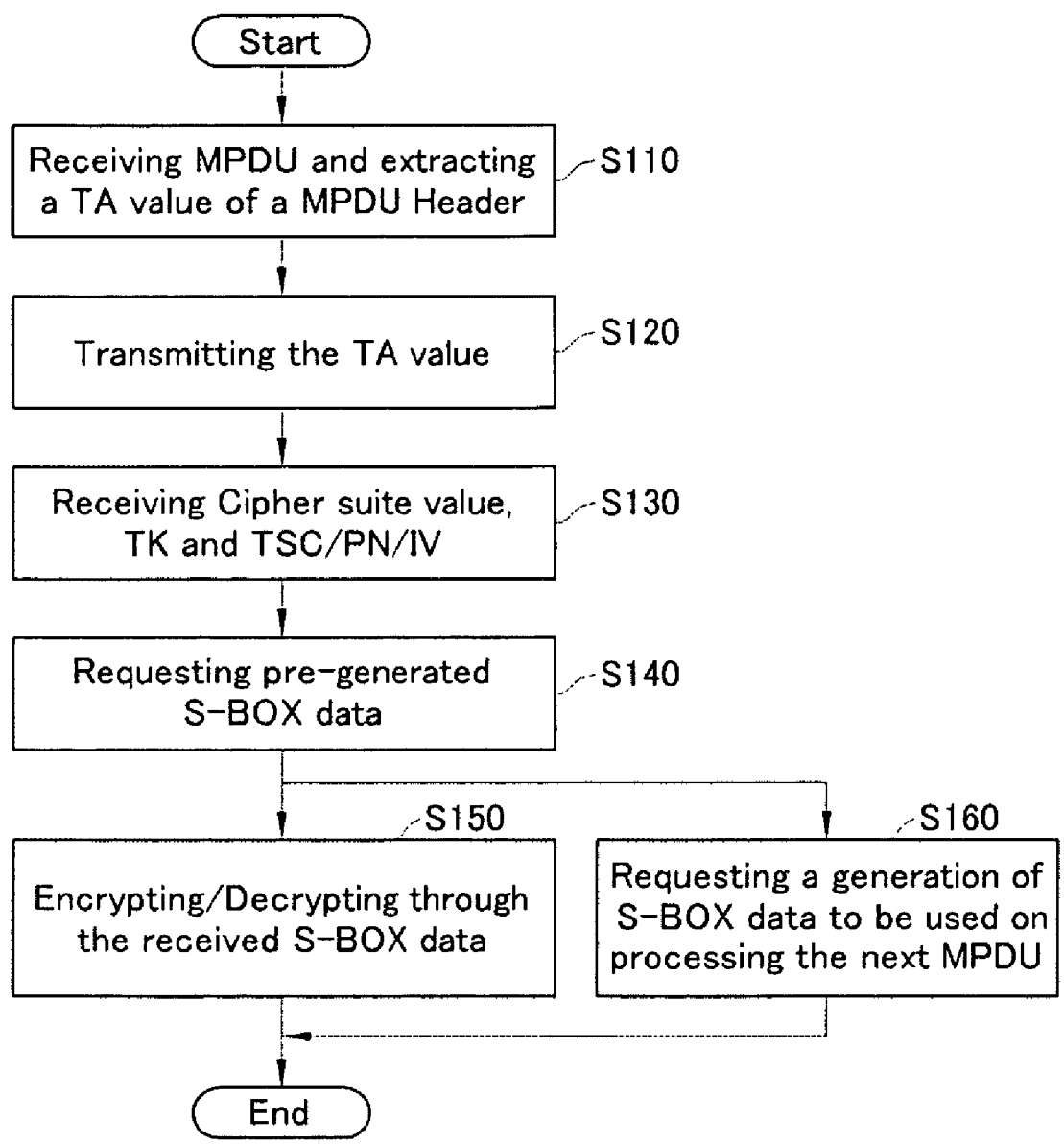
FIG. 3 is a flowchart illustrating a key sequence process performed in an encryption/decryption section 200.

FIG. 3 is a flowchart illustrating a key sequence process performed in an encryption/decryption section 200.

The cipher engine, that is, the encryption/decryption unit 200, receives the MPDU to be processed and extracts the TA values from the header of the MPDU (S110).

The encryption/decryption unit 200 transmits the extracted TA through the SHM interface 160 to the key and register management unit 100 (S120) and receives the cipher suite value, the TK value, and the data ID value (TSC, PN, or IV) for the respective TAs from the key and register management unit 100 (S130).

When the cipher suite value is the WEP or the TKIP, it can be determined whether the pre-calculated S-Box data stored at the S-Box data memory 180 is used. If they can be, the key and register management unit 100 is requested to transmit the S-Box data (S140).

When the S-Box data have been transmitted, the encryption/decryption unit 200 starts the encryption/decryption process (S150), requests for the key and register management unit 100 to transmit the TA and the 1-added data ID value (TSC or IV), and to previously generate the S-Box data to be used on processing the next MPDU (S160).

While the encryption/decryption unit 200 processes the encryption/decryption in this manner, the key and register management unit 100 previously generates the S-Box data to be used on processing the next MPDU. Accordingly, when the next MPDU data are transmitted, the pre-calculated S-Box data are used so that the encryption/decryption is directly started. Thus, the delay of the data processing time occurring by the key scheduling process can be prevented and the encryption/decryption can be rapidly performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, while the encryption/decryption processes is performed, the S-Box data to be used on processing the next MPDU is previously generated. Accordingly, when the next MPDU data are transmitted, the pre-calculated S-Box data are used so that the encryption/decryption is directly started. Thus, the delay of the data processing time occurring by the key scheduling process can be prevented and the encryption/decryption can be rapidly performed. In addition, the number of the cycles can be reduced for the respective MPDU and the response speed can be enhanced thereby enhancing data processing performance of the entire system.

What is claimed is:

1. An encryption/decryption apparatus for encrypting/decrypting first data using an RC4 algorithm, comprising:
    a management unit including a wired equivalent privacy seed key generator for generating a WEP seed key based on a transmitter address of first data and a cipher suite value representing a cipher protocol type for the transmitter address, an RC4 key scheduler for generating S-Box data using the WEP seed key, and an S-Box data memory storing the S-Box data generated from the RC4 key scheduler for the transmitter addresses;
    an encryption/decryption unit having a core for performing the RC4 algorithm corresponding to the cipher suite, encrypting/decrypting the first data using the S-Box data transmitted from the management unit, and transmitting a signal for previously generating the S-Box data of second data to the management unit; and
    a first interface for transmitting a control signal and a data signal between the management unit and the encryption/decryption unit.

2. The encryption/decryption apparatus of claim 1, wherein the management unit further includes:
    a temporal key memory for storing a temporal key for encrypting/decrypting the transmitter address;
    a cipher suite memory for storing the cipher suite value;
    a TSC_PN_IV memory for storing data ID values corresponding to respective cipher suite values; and
    a second interface for receiving at least one of the transmitter address, the cipher suite value, the data ID value, and the temporal key through a communication net.

3. The encryption/decryption apparatus of claim 2, wherein the second interface is a programmable communication interface (PCI).

4. The encryption/decryption apparatus of claim 1, wherein the first interface includes a storage hierarchy management interface.

5. The encryption/decryption apparatus of claim 1 wherein the cipher suite is selected from a Wired Equivalent Privacy (WEP), a Temporal Key Integrity Protocol (TKIP), and a Counter with CBC-MAC Protocol (CCMP).

6. The encryption/decryption apparatus of claim 5. wherein the data-ID value is respectively given as an IV value, a TSC value, and a PN value, when the cipher suite is respectively given as a WEP, a TKIP, and a CCMP.

7. The encryption/decryption apparatus of claim 1, wherein the S-Box data generating signal includes a value with 1 added to the data ID and a receiver address.

8. The encryption/decryption apparatus of claim 1, wherein the RC4 key scheduler receives the S-Box data generating signal from the encryption/decryption unit to generate the S-Box data for encrypting/decrypting the second data while the encryption/decryption unit encrypts/decrypts the first data.

9. The encryption/decryption apparatus of claim 1, wherein the S-Box data memory is a dual-port RAM.

10. A method for encrypting/decrypting first data received using an RC4 algorithm at a cipher engine wherein the cipher engine generates and stores S-Box data through an interface, comprising:

a) receiving the S-Box data corresponding to first data from a management unit;

b) encrypting/decrypting the first data using the S-Box data; and c) transmitting a signal to the management unit, the signal being used for previously generating S-Box data corresponding to second data to be input next to the first data.

11. The method for encrypting/decrypting of claim 10, wherein the step c) of transmitting the S-Box data generating signal is simultaneously performed with the step b) of encrypting/decrypting the first data.

12. The method for encrypting/decrypting of claim 10, comprising, before the step a):

a-1) transmitting a transmitter address to the management unit, the transmitter address extracted from the first data;

a-2) receiving a cipher suite value, a temporal key value, and a data ID value corresponding to the transmitter address from the management unit; and a-3) requesting the corresponding S-Box data based on the received cipher suite value.

13. The method for encrypting/decrypting of claim 12, wherein the S-Box data generating signal includes a value with 1 added to the data ID corresponding to the first data and a receiver address.

* * * * *